UNITED STATES PATENT OFFICE.

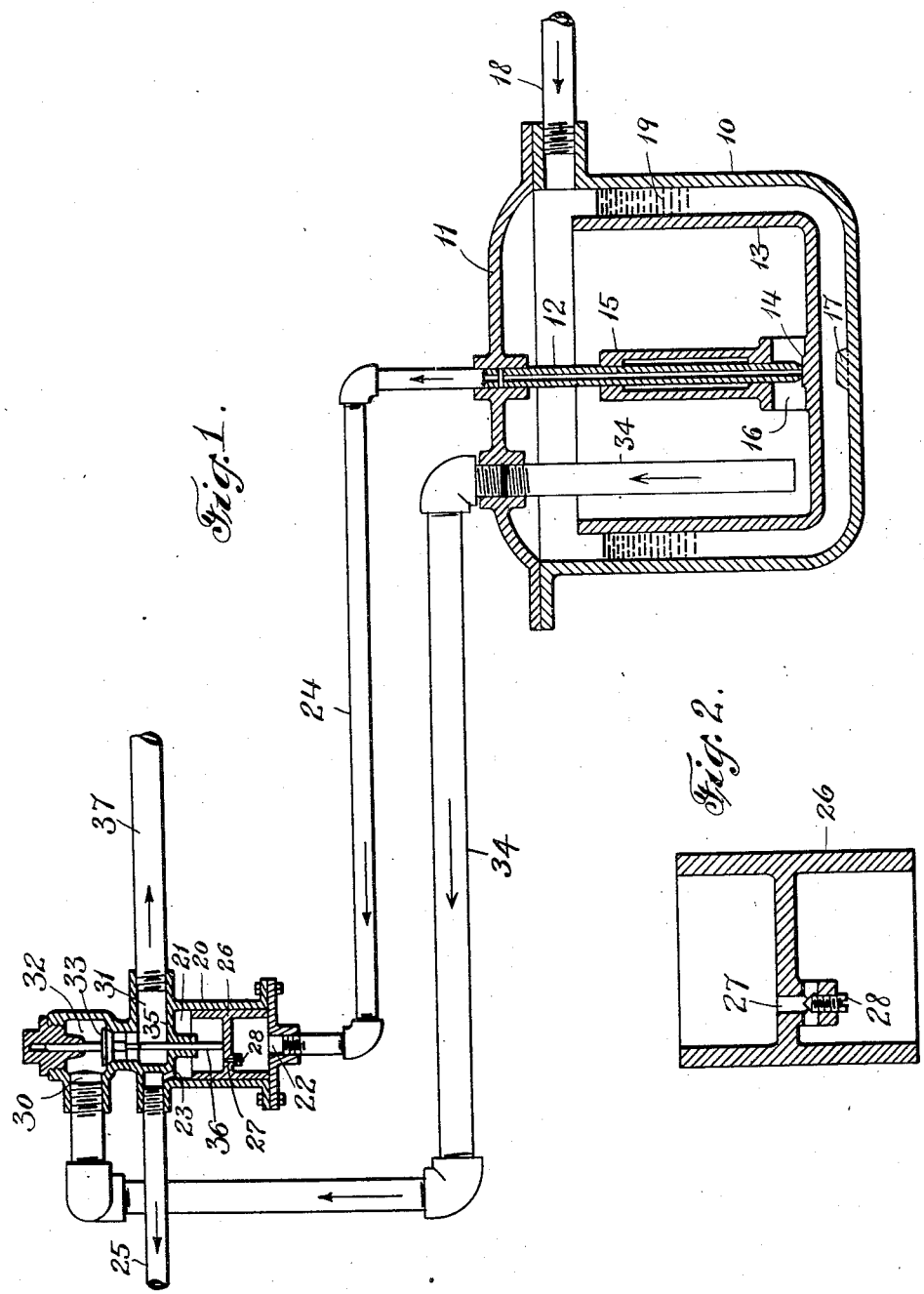

RICHARD J. FLINN, OF BOSTON, MASSACHUSETTS.

ATTACHMENT FOR STEAM-TRAPS.

959,927.   Specification of Letters Patent.   Patented May 31, 1910.

Application filed July 24, 1909. Serial No. 509,350.

*To all whom it may concern:*

Be it known that I, RICHARD J. FLINN, of Boston, in the county of Suffolk and State of Massachusetts, have invented certain new and useful Improvements in Attachments for Steam-Traps, of which the following is a specification.

This invention relates to steam traps, and its object is to provide an attachment for a steam trap whereby the discharge from the trap may be increased. A steam trap designed for use under comparatively low pressure may be provided with a comparatively large outlet valve, whereas a steam trap used under high pressure must be restricted to a relatively small outlet valve. To those skilled in the art it is well known that when the outlet valve of a trap is closed the closing force is greater with a high pressure than with a low pressure, because the valve seat deprives one side of the valve of the area necessary to counteract the excess pressure behind the valve. It therefore follows that by reducing the outlet valve it is more nearly balanced but the discharging capacity is correspondingly restricted.

The present invention is embodied in an attachment for supplementing the discharging capacity of traps of various types and proportions. The structure of the attachment includes a casing formed with two separate compartments, each having an inlet and an outlet. The primary discharge from the trap valve is admitted to one of said compartments and the water in the trap is conducted by a separate conduit to the other of said compartments. The supplemental discharge conduit is initially closed by a normally seated valve in the supplemental compartment. The primary compartment is employed as a pressure chamber and provided with means for opening the valve of the supplemental compartment. By this means a supplemental discharge is effected and controlled by a primary discharge.

Referring to the drawings, which illustrate one form in which the invention may be embodied, Figure 1 represents a sectional view of an attachment installed in connection with a steam trap of a well known bucket type. Fig. 2 represents a section on a larger scale of the piston contained in the attachment.

The same reference characters indicate the same parts wherever they occur.

It is to be understood that the invention is adapted to be applied to a steam trap of any one of the several well known types, and that the purpose of combining it with a trap of the bucket type is intended by way of illustration only, and not by way of limitation.

On the drawings is represented a steam trap comprising a casing 10 and a cover 11.

12 indicates a discharge pipe affixed to the cover and extending downwardly into the trap and through which the initial discharge is conducted.

13 indicates a bucket formed with a boss 14 upon the upper surface of its bottom which is adapted to coöperate with the lower end of the discharge pipe 12, and which therefore constitutes a primary discharge valve. The bucket is provided with a central core 15 which embraces and is adapted to slide upon the pipe 12 for the purpose of guiding the boss 14 toward and from the end of the pipe 12. The contents of the bucket may flow to the lower end of the pipe 12 through a passage 16 formed at the base of the core 15. The interior of the casing 10 may be provided with a boss 17 for limiting the downward movement of the bucket.

18 indicates a pipe by which the products of condensation are delivered to the trap to be thereafter discharged into the atmosphere. The condensed fluid 19 which accumulates in the casing 10 normally floats the bucket so as to close the primary discharge valve, and when the bucket is empty, it is held against the end of the pipe 12 with additional force by reason of the pressure from the pipe 18 which exerts its force upwardly to a greater degree than downwardly because of the larger area of the lower surface of the bucket. When the liquid in the casing overflows the bucket to such extent as to fill the bucket, the weight thereof is sufficient to depress the bucket and open the primary discharge valve in the usual manner. The liquid is then forced out through the pipe 12 by reason of the pressure from the pipe 18 until the weight of the liquid in the bucket becomes less than the bouyancy without.

It will be observed that the discharge opening at the bottom of the pipe 12 is relatively small. The purpose of restricting the outlet is to not unduly cover the upper surface of the bottom of the bucket, and thereby enable the pressure against the under side of the bucket and the buoyancy to predominate over the combined pressure upon the upper surface of the bottom and the weight of the liquid when the bucket is filled. It is necessary to restrict the discharge opening to a greater extent when the trap is used for a high pressure than when it is used for a low pressure, and the value of the present invention is that it is adapted to supplement a steam trap used for a high pressure for the purpose of increasing the discharge of the contents.

The attachment to which the present invention relates comprises a casing 20 provided with two chambers and a partition by which the chambers are closed, each with relation to the other. One chamber 21 may be cylindrical, and may have an inlet 22. The primary discharge from the trap valve is conducted by a conduit 24 communicating with the inlet 22, and may be permitted to escape to the atmosphere at any convenient point.

26 indicates a piston which has a free sliding fit in the cylinder 21. The piston may be formed with a longitudinal port 27 (see Fig. 2) through which the primary discharge may escape, and the cylinder may have an outlet 23 communicating with a drain pipe 25. In lieu of this arrangement of the drain pipe, an escape at any other point of the primary discharge conduit would serve as well. The other chamber of the casing 20, hereinafter termed a supplemental chamber, is indicated at 32. It has an inlet 30 and an outlet 31, which is normally closed by a valve 33. The inlet 30 receives the supplemental discharge from the trap bucket through a conduit 34 which extends into the interior of the bucket and through the cover 11 of the trap. The outlet 31 is separated from the cylinder 21 by a partition 35 which constitutes one head of the cylinder.

36 indicates a valve rod which extends through the partition 35, and which is adapted to be actuated by the piston for opening the valve 33. The rod 36 fits accurately in its bearing in the partition 35 and prevents the passage of fluid from the cylinder to the outlet 31, and vice versa. The supplemental discharge from the outlet 31 may be conducted through a drain pipe 37 to any convenient point.

When installing the attachment, the adjusting screw 28 is adjusted according to the pressure in the pipe 18 so as to reduce the capacity of the port 27 in order to permit a partial discharge through the port, but to effect considerable pressure between the inlet 22 and the piston. When the screw 28 is adjusted to give this result, the operation of the trap and attachment is as follows:—

A discharge through the supplemental conduit 34 is initially prevented by a normally closed valve 33 and the discharge through the pipe 12 is initially closed, as previously described, by the elevated bucket 13. When the bucket falls to permit the primary discharge through the pipe 12, the liquid under pressure passes through the conduit 24 into the cylinder 21. A portion of the primary discharge passes through the port 27, through the outlet 23 and the conduit 25, but pressure is developed in the cylinder which raises the piston, the valve lifter 36, and the valve 33, thereby opening a passage for a discharge into the supplemental conduit 37. The pressure within the trap then forces the liquid through the relatively large supplemental conduit 34 into the valve chamber 33 from which it passes to the outlet 31 and conduit 37. The primary discharge may continue while the supplemental discharge is occurring until the pressure behind the piston ceases, whereupon the valve 33 normally resumes its seat and cuts off the supplemental discharge. The trap valve is closed by the rising of the bucket, as hereinbefore described.

It will be observed that the primary and supplemental discharges through the casing 20 are entirely separate and apart, and that the one has no effect on the other, except that the pressure against the piston developed by the primary discharge operates to open the valve for the supplemental discharge. Other than that, the two discharges are independent of each other and the impact of the supplemental discharge in flowing from the valve opening to the conduit 37 has no effect in restoring the piston because the cylinder 21 is separated from the outlet 31 by the partition 35 and the valve lifter 36.

It is obvious that the attachment constructed and operated in accordance with the foregoing explanation, is adapted to traps of other types, as well as to traps of the bucket type. The only essentials in operating the attachment are an automatic discharge valve within the trap, a conduit connecting the trap valve with the cylinder of the attachment, and a supplemental conduit extending from the interior of the trap to the valve chamber of the attachment. It is immaterial whether the trap valve be controlled by a float, a bucket, a diaphragm, a thermostatic device, or any other means for operating a valve.

The foregoing description of the operation of the attachment applies when it is desired to amplify the discharge from the trap. If for any reason it should be desired to render the supplemental discharge valve inoperative, as is sometimes the case when the products of condensation are limited, the adjusting screw 28 may be withdrawn so as to provide a full opening at the port 27. The capacity of the port when fully opened is equal to that of the primary discharge valve in the trap, and consequently, the port is adapted to conduct the primary discharge without effecting pressure in the cylinder. The result of giving the port 27 its full opening is to provide an escape for the primary discharge, without effecting pressure for opening the supplemental valve.

I claim:

1. An attachment for supplementing the discharge from a steam trap, comprising a casing formed with a primary chamber, a supplemental chamber, and a partition closing said chambers, one with relation to the other, a discharge conduit from the trap valve communicating with said primary chamber, a movable member arranged in said primary chamber and constructed to be moved by pressure therein, a supplemental conduit extending from the lower part of the trap to said supplemental chamber, an outlet in said supplemental chamber, a valve controlling said outlet, and a valve rod extending from said valve through said partition to the movable member in said primary chamber, whereby the valve may be opened.

2. An attachment for supplementing the discharge from a steam trap, comprising a casing formed with a cylinder, a supplemental chamber, and a partition closing said cylinder and chamber, one with relation to the other, a discharge conduit from the trap valve communicating with said cylinder, a piston arranged in said cylinder, a supplemental conduit from the lower part of the trap to said supplemental chamber, an outlet for said chamber, a supplemental valve controlling the discharge from said chamber, a rod extending from said piston through said partition and arranged to open said supplemental valve, an escape opening for the primary discharge from the trap valve, and adjustable means controlling the escape of said primary discharge.

3. An attachment for a steam trap comprising a casing having two separate chambers, of which one is arranged to form a part of the discharge conduit of the trap valve, a supplemental discharge conduit including the other chamber and terminating within the trap, a valve for the outlet of the supplemental chamber, means coöperating with the flow in the primary chamber for opening the supplemental valve, said means including a flow passage for the primary discharge, and adjustable means for varying said passage whereby the means may be rendered inoperative.

4. An attachment for a steam trap comprising a primary discharge conduit for water controlled by the trap valve, a supplemental discharge conduit for water, a valve for controlling the supplemental conduit, means in the primary conduit and operable by the pressure therein for opening the supplemental valve, and means in the primary conduit for varying the outlet thereof.

In testimony whereof I have affixed my signature, in presence of two witnesses.

RICHARD J. FLINN.

Witnesses:
W. P. ABELL,
P. W. PEZZETTI.